United States Patent [19]

Eidem

[11] Patent Number: 4,769,066
[45] Date of Patent: Sep. 6, 1988

[54] METHOD FOR REMOVING INCLUSIONS FROM A BATH OF MOLTEN METAL AND A DEVICE FOR CARRYING OUT THIS METHOD

[75] Inventor: Magnus Eidem, Skultuna, Sweden

[73] Assignee: Asea AB, Vasteras, Sweden

[21] Appl. No.: 13,672

[22] Filed: Feb. 12, 1987

[30] Foreign Application Priority Data

Feb. 24, 1986 [SE] Sweden .............................. 8600823

[51] Int. Cl.[4] ........................... C22B 4/00; C21C 5/52
[52] U.S. Cl. .................................. 75/10.67; 75/10.14; 75/61; 266/234; 266/237
[58] Field of Search ...................... 75/10.14, 10.67, 61, 75/46, 49; 266/234, 237

[56] References Cited

U.S. PATENT DOCUMENTS 3,519,059 7/1970 Voskoboinikov ................ 75/10.14

Primary Examiner—Peter D. Rosenberg
Attorney, Agent, or Firm—Kenyon & Kenyon

[57] ABSTRACT

The invention relates to a method for removing inclusions of foreign matter (for example slag inclusions) from a bath of molten metal. The method is characterized in that molten metal located in a bath in a vessel is rotated about a vertical axis by means of at least one electromagnetic stirrer, to cause the inclusions to move towards the center of the vessel where they agglomerate and float up to the bath surface. Molten metal substantially free from inclusions can then be tapped off from a lower part of the vessel, to one side of said axis.

11 Claims, 1 Drawing Sheet

U.S. Patent     Sep. 6, 1988     4,769,066

METHOD FOR REMOVING INCLUSIONS FROM A BATH OF MOLTEN METAL AND A DEVICE FOR CARRYING OUT THIS METHOD

TECHNICAL FIELD

The present invention relates to a method for removing inclusions of foreign matter (e.g. slag inclusions) from a molten metal.

One problem in connection with methods of removing inclusions of foreign matter from a bath of molten metal is to achieve separation in a manner which is favourable both from an economic and from a production point of view without the use of complicated equipment or without downgrading the quality of the end product. This may often be a metallurgically and technically difficult problem.

SUMMARY OF THE INVENTION

The method according to the invention aims to provide a solution to the problems arising in this connection and is characterized in that molten metal located in a bath in a vessel, is rotated about a vertical axis by means of at least one electromagnetic stirrer, to cause the inclusions of foreign matter to move towards the axis where they agglomerate and float up towards the bath surface, molten metal substantially free of inclusions then being tapped off through at least one tap hole located in a lower part of the vessel to one side of said axis.

Several advantages are gained by a method according to the invention. The separation of the inclusions from the rest of the bath proceeds rapidly and efficiently, while at the same time a certain homogenization of the molten metal occurs both with regard to temperature and constituents. Also, a certain degree of heat input into the molten metal is obtained by means of the stirrer, this preventing excessive cooling of the bath.

In a preferred embodiment, the molten metal is tapped off through at least one tap hole in the bottom of the vessel, located eccentrically and desirably close to a or the side wall of the vessel. Tapping can thus be carried out in an extremely simple but also efficient manner.

The invention also relates to a device for carrying out the above-described method, which comprises a vessel (e.g. a ladle) having at least one surrounding electromagnetic stirrer, the stirrer being arranged to stir the molten metal about a vertical axis and a lower part of the vessel is provided with at least one tapping hole located in a position away from the vertical axis of rotation.

The molten metal which is tapped off from the offaxis location is substantially free from dispersed slags, and the molten metal removed from the vessel is therefore slag-free. The rotation of the molten metal in the bath is brought about by inductive stirring and can be performed in such a way that the natural heat losses from the molten metal can be compensated for by simultaneous inductive heating of the bath.

BRIEF DESCRIPTION OF THE DRAWING

One embodiment of method and device according to the invention is illustrated, by way of example, in the accompanying drawing, FIG. 1 of which is a schematic sectional side view of a vessel containing a bath of molten metal, the vessel being provided with a surrounding electromagnetic stirrer, and FIG. 2 a scrap section of part of the wall of the vessel.

DESCRIPTION OF PREFERRED EMBODIMENT

Figure 1:
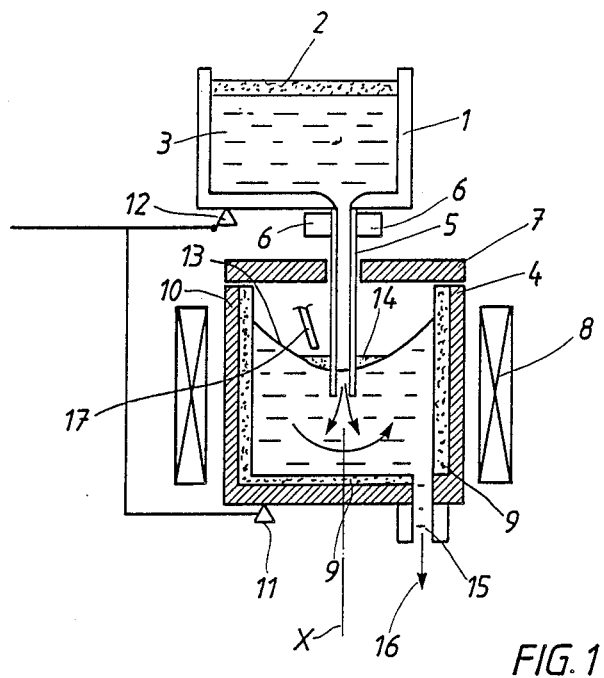

Referring to the drawing, molten metal is tapped from a primary ladle or tundish 1, which in turn can be filled from a furnace or other container (not shown). A layer of slag 2 covers the molten metal 3 in the ladle 1 and may to a certain extent, in the form of dispersed slag or in some other form, flow out with the molten metal when the latter is tapped into a subsequent vessel 4. The tapping is shown as being performed via a tapping pipe 5 which is associated with a flow-regulating device 6, such as an electromagnetic valve, a sliding valve, or some other form of flow control means.

The tapping pipe 5 opens out below the upper surface of the molten metal in the vessel 4 and passes through an opening in a roof or lid 7 of the vessel 4.

The vessel 4 is surrounded by an electromagnetic, inductive stirrer 8 which is powered with multi-phase current and which comprises a closed coil or several coils (as in the stator of an asynchronous motor). The stirrer 8 is arranged so that the flow pattern induced in the molten metal causes the latter to rotate about a vertical (preferably central) axis X, for example about an axis coaxial with the center of the tapping pipe 5.

The induced stirring pattern can also impose vertical movements on the melt (in addition to the rotational stirring described) to encourage inclusions of foreign matter to float up to the surface and to improve the homogenization of the molten metal. A certain heating or heat-retaining effect can also be arranged in the vessel 4.

Figure 2:
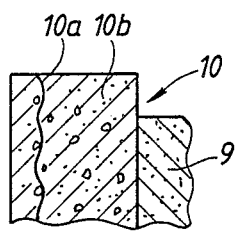

The vessel 4 may be of the so-called CALIDUS type (see the disclosure of US patent application Ser. No. 698,447, filed on Feb. 5th, 1985, in the names Larsson, Westman and Östlund), comprising an inner thermally insulating lining compound 9 and an outer part 10 of a metallic reinforcement, embedded in a mass of concrete or cement. FIG. 2 shows a scrap section through the outer part 10, the reinforcement being shown at 10a and the cement mass at 10b.

A sensor 11 of any suitable type may be arranged on the vessel 4, which sensor 11 weighs the vessel 4 with its contents, the output signal of the sensor 11 being used to control the flow of the molten metal by means of the flow-regulating device 6. Also the ladle or tundish 1 can be weighed (using a sensor 12) for the same control purpose.

Because the vessel 4 is manufactured of a nonmagnetic material, which allows magnetic travelling fields to penetrate into the melt, the walls of the vessel 4 are therefore not heated to any significant extent. The refractory lining compound 9 may be adapted to the metallurgical conditions in the molten metal.

By virtue of the stirring pattern arising in the melt, a sort of centrifugal effect is obtained which separates particles into the vicinity of the axis about which the stirring occurs and where a convex molten metal surface 13 is formed, agglomerated particles collect in a layer 14. This layer 14 can be removed in a simple manner, for example by suction, by means of a suction apparatus and a closing hood or by means of mechanical deslagging. The slag removing means is shown schematically at 17 in the drawing.

A flocculating agent, which renders the slag harder and easily removable, or an absorption agent such as lime, may be added to the molten metal.

All types of molten metals can benefit from treatment in the device described.

The centrifugal effect causes the peripherally located molten metal to become free from slag inclusions, and in this pure form the molten metal can be tapped off through one or more eccentrically located tap holes 15 (see the arrow 16) into a subsequent tundish or mold (not shown).

The device described can be used for separating slag from molten metal in connection with:
1. Casting of steel/molten metals, mold casting and continuous casting,
2. Atomization of molten metals for metal powder production,
3. Other applications.

The method and the device described above can be varied in many ways within the scope of the following claims.

What is claimed is:

1. A method of removing inclusions of foreign matter from a bath of molten metal, located in a vessel, comprising the steps of, rotating the molten metal about a vertical axis by means of at least one electromagnetic stirrer to cause the inclusions to move towards the axis where they agglomerate and rise up to the upper surface of the bath and tapping molten metal substantially free from inclusions from the bath through at least one tap hole located in a lower part of the vessel and to one side of the said axis.

2. A method according to claim 1, in which the molten metal is tapped through at least one tap hole in the bottom of the vessel, said tap hole being located eccentrically near a side wall of the vessel.

3. A method according to claim 1, in which molten metal is tapped into the vesel through a pipe extending from a preceding melt container along approximately the vertical axis of melt rotation, said pipe opening out below the upper surface of the bath of molten metal.

4. A method according to claim 1, in which the upper surface of the melt acquires a cup-shaped form due to the rotation and slag is removed from the center of the cup-shaped upper surface by a suction means.

5. A method according to claim 1, in which the upper surface of the melt acquires a cup-shaped form due to the rotation and slag is removed from the center of the cup-shaped upper surface by a mechanical means.

6. A method according to claim 4, in which prior to being removed, the slag is hardened by the addition of a flocculating agent.

7. A method according to claim 5, in which prior to being removed, the slag is hardened by the addition of a flocculating agent.

8. A method according to claim 4, in which prior to being removed, the slag is hardened by the addition of lime.

9. A method according to claim 5, in which prior to being removed, the slag is hardened by the addition of lime.

10. A method of removing inclusions of foreign matter from a bath of molten metal, located in a vessel, comprising the steps of, rotating the molten metal about a vertical axis by means of at least one electromagnetic multiphase current fed stirrer to cause the inclusions to move towards the axis where they agglomerate and rise up to the upper surface of the bath and tapping molten metal substantially free from inclusions from the bath through at least one tap hole located in a lower part of the vessel and to one side of the said axis.

11. A method for removing inclusions from molten metal tapped from a container containing the molten metal with a layer of slag floating on its surface and forming the inclusions in the tapped metal, comprising tapping said metal from the container into a vessel and forming a collection of the metal in the vessel, rotating said collection about a vertical axis and centrifugally causing the inclusions to move towards said axis and agglomerate and float to the surface of the collection adjacent to the axis, mechanically removing the agglomerated inclusions from said surface, and tapping the collection from its lower portion and at a position offset from said axis.

* * * * *